United States Patent [19]
Christy

[11] Patent Number: 4,744,934
[45] Date of Patent: * May 17, 1988

[54] PROCESS FOR DEVOLATILIZING MOLTEN OXYMETHYLENE POLYMER

[75] Inventor: Ronald S. Christy, Kingsville, Tex.

[73] Assignee: Hoechst Celanese Corporation, Chatham, N.J.

[*] Notice: The portion of the term of this patent subsequent to Sep. 8, 2004 has been disclaimed.

[21] Appl. No.: 834,981

[22] Filed: Feb. 28, 1986

Related U.S. Application Data

[63] Continuation-in-part of Ser. No. 797,054, Nov. 12, 1985, Pat. No. 4,692,290.

[51] Int. Cl.$^4$ .................................................. B29B 7/84
[52] U.S. Cl. ...................................... 264/101; 264/102; 264/169; 264/211.23; 264/331.22; 264/349; 264/DIG. 78; 525/927; 528/270
[58] Field of Search .................. 264/101, 39, 169, 211, 264/DIG. 78, 211.23, 331.22; 425/381.2, 376 B, 72 S; 159/2.2; 528/270; 525/927

[56] References Cited

U.S. PATENT DOCUMENTS

| | | | |
|---|---|---|---|
| 3,027,352 | 3/1962 | Walling et al. | 264/176 F |
| 3,219,623 | 11/1965 | Berardinelli | 264/176 F |
| 3,318,848 | 5/1967 | Clark | 264/176 F |
| 3,336,262 | 8/1967 | Sidi | 264/176 F |
| 3,418,280 | 12/1968 | Orgen | 264/176 F |
| 3,433,861 | 3/1969 | Hamilton et al. | 264/176 F |
| 3,545,041 | 12/1970 | Maxwell | 425/381.2 |
| 4,194,841 | 3/1980 | Tadmor | 366/75 |
| 4,362,852 | 12/1982 | Pendlebury et al. | 264/211 |
| 4,411,532 | 10/1983 | Valsamis et al. | 264/176 C |

Primary Examiner—Jeffery Thurlow
Attorney, Agent, or Firm—Burns, Doane, Swecker & Mathis

[57] ABSTRACT

A process is provided for reducing black speck formation which occurs during melt processing of oxymethylene polymer compositions containing polyamide stabilizers having a melting or softening point below the melting point of the oxymethylene polymer and for simultaneously removing volatile materials from a molten oxymethylene polymer, according to which from about 0.05 to about 5.0 weight percent based on the weight of the oxymethylene polymer of said polyamide stabilizer and from about 0.05 to about 10.0 weight percent, based on the weight of the oxymethylene polymer, of hindered phenol antioxidant is added while the molten polymer is passed through a rotating disk polymer processor having at least three stages; a first devolatilization stage, then a stabilization stage and then a second devolatilization stage. The molten polymer in the first devolatilization stage is maintained at a temperature above its melting point in the temperature range of from about 160° C. to about 220° and at a vapor space pressure of from about 0.1 to about 500 Torr. The polymer in the stabilization stage is maintained in the molten state at a temperature of from 160° C. to about 220° C. The polymer in the last devolatilization stage is maintained in the molten state at a temperature of from about 160° C. to 220° C. and at a vapor space pressure of from about 0.1 to about 200 Torr.

7 Claims, No Drawings

PROCESS FOR DEVOLATILIZING MOLTEN OXYMETHYLENE POLYMER

This application is a continuation-in-part of application Ser. No. 06/797,054, filed Nov. 12, 1985, now U.S. Pat. No. 4,692,290 issued Sept. 8, 1987.

FIELD OF THE INVENTION

This invention relates to an improved method of devolatilizing and stabilizing molten oxymethylene polymers containing a polyamide stabilizer and a hindered phenol antioxidant. More particularly, this invention relates to a method of removing formaldehyde and other volatile materials, such as triethylamine and water from molten, extrudable and moldable oxymethylene polymers while at the same time improving or reducing the black speck formation which frequently occurs during the processing and compounding of oxymethylene polymers containing a polyamide stabilizer.

BACKGROUND OF THE INVENTION

Oxymethylene polymers, as that term is used herein and further defined below, means those polymers having recurring —OCH$_2$— units directly attached to each other. Such polymers have been known for many years. They may be prepared by the polymerization of anhydrous formaldehyde or by the polymerization of trioxane, which is a cyclic trimer of formaldehyde. Oxymethylene copolymers have at least one chain containing recurring oxymethylene units interspersed with —OR— groups in the main polymer chain, where R is a divalent radical containing at least two carbon atoms directly linked to each other and positioned in the polymer chain between the two valences, with any substituents on the R radical being inert, that is those which are free of interfering functional groups and will not induce undesirable reactions. Particularly preferred are copolymers which contain from 60 to 99.9 mol percent of recurring oxymethylene groups. The R may be, for example, an alkylene or substituted alkylene group containing at least two carbon atoms.

Among the copolymers which may be utilized are those having a structure comprising recurring units having the formula:

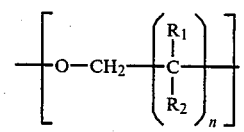

wherein n is an integer from zero to 5 and wherein n is zero in from 60 to 99.9 percent of the recurring units. R$_1$ and R$_2$ are inert substituents, that is, substituents which are free of interfering functional groups and will not induce undesirable reactions.

Particularly preferred oxymethylene copolymers are those having incorporated therein oxyalkylene units having adjacent carbon atoms which are derived from cyclic ethers having adjacent carbon atoms. These copolymers may be prepared by copolymerizing trioxane with a cyclic ether having the structure:

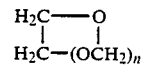

wherein n is an integer from zero to 2.

Examples of preferred polymers include copolymers of trioxane and cyclic ethers containing at least two adjacent carbon atoms such as the copolymers disclosed in U.S. Pat. No. 3,027,352, incorporated herein by reference. Among the specific cyclic ethers which may be used are ethylene oxide; 1,3-dioxolane; 1,3,5-trioxepane; 1,3-dioxane; trimethylene oxide; pentamethylene oxide; 1,2-propylene oxide; 1,2-butylene oxide; neopentyl glycol formal; pentaerythritol diformal; paraldehyde; tetrahydrofuran and butadiene monoxide. As used in the specification and claims of this application, the term "copolymer" means polymers having two or more monomeric groups, including terpolymers and higher polymers.

After polymerization, oxymethylene polymers, such as those comprising trioxane-ethylene oxide copolymer chains, contain unstable polyformaldehyde ends, which must be removed in order to improve the thermal stability and other properties of the acetal copolymer. For this purpose, a hydrolysis process, such as that disclosed in U.S. Pat. No. 3,219,623, incorporated herein by reference, may be used. More specifically, a melt hydrolysis process, such as that disclosed in U.S. Pat. Nos. 3,318,848 and 3,418,280, incorporated herein by reference, is preferably utilized.

In the past, it was very difficult to remove enough volatile material (e.g. trioxane, formaldehyde, formic acid, water, hydrolysis agent, etc.) to provide a product suitable for direct use. Subsequent devolatilization and compounding were required to remove volatiles in separate steps, to avoid excessive color formation.

Copending U.S. patent application Ser. No. 664,796 of Auerbach et al, filed Oct. 25, 1984, incorporated herein by reference, describes and claims a moldable oxymethylene polymer containing a minor amount of a polyamide stabilizer which must be in a dispersion. The composition may also contain a hindered phenol antioxidant and an amidine stabilizer.

The incidence of black speck contamination in conventional extrusion or compounding equipment is accelerated when processing molten oxymethylene polymers containing polyamide stabilizers. Under such circumstances it is common to require cleaning the equipment as frequently as every two or three days, to produce oxymethylene molding compositions having an acceptably low level of black speck contamination.

Accordingly, there exists a need in the art for an improved method of devolatilizing oxymethylene polymers containing polyamide stabilizers, to remove formaldehyde and other volatile materials in a manner such that black speck generation is minimized and the need for frequent cleaning of extrusion or compounding equipment is substantially reduced. The process of the present invention provides an answer to this need and also provides a product which has a low level of free formaldehyde, low tendency to form mold deposits, low molding odor, good heat aged color, in addition to a low level of black specks, an does not require the polyamide stabilizer to be added as a dispersion.

SUMMARY OF THE INVENTION

A process is provided for minimizing or reducing black speck formation and for removing formaldehyde and other volatile materials from a molten oxymethylene polymer containing a minor amount of both a hindered phenol antioxidant and a polyamide stabilizer. Such a molten oxymethylene polymer is passed through a rotating disk polymer processor having at least three stages—a first devolatilization stage, then a first stabilization stage and then a last devolatilization stage. When an oxymethylene copolymer is employed in the present process, it is preferably hydrolyzed before it is subjected to devolatilization.

The polyamide stabilizer used in the instant invention can be any polyamide having a melting or softening point below the melting point of the oxymethylene polymer into which it is incorporated or with which it is to be admixed. The polyamide may be crystalline, partially crystalline or amorphous. In the case of an amorphous polyamide, its softening point or temperature should be below the melting point or temperature of the oxymethylene polymer. In short, so long as an amorphous polyamide is processable in the compounding and molding equipment at a temperature below the melting temperature of the oxymethylene polymer it can be used. In all such instances the softening point of the polyamide will be below the melting point of the oxymethylene polymer. Generally, the melting temperature or softening temperature of the polyamide should be from about 3° C. to about 10° C. or more below the melting temperature of the oxymethylene polymer. The melting temperature is measured by differential scanning calorimetry.

The polyamide must also be one which is stable and does not decompose during the oxymethylene polymer compounding and molding operations.

The polyamides, within the above limitations, can vary widely in composition and molecular weight. They are selected from the many macromolecular polyamides known in the art in which carboxamide linkages

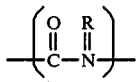

form an integral part of the polymer chain and which upon hydrolysis yields monomeric compounds selected from (1) mixtures of dicarboxylic acids and diamines and (2) omega-aminomonocarboxylic acids. These polyamides preferably have carboxamide linkages in which R is hydrogen, alkyl or alkoxy. The molecular weight of the polyamides can vary widely, with degrees of polymerization ranging from about 50 to 500.

The preferred polyamides have a melting temperature or softening temperature of from about 105° C. to about 160° C. A particularly preferred polyamide is a terpolymer of nylon 6,6/6,10/6, which has a melting point of about 150° C. to about 157° C.

The amount of polyamide used will vary depending upon the particular oxymethylene polymer used and the degree of stability desired. Generally, the amount of polyamide used is from about 0.05 to about 5.0 weight percent, based on the weight of the oxymethylene polymer, preferably from about 0.1 to about 5.0 weight percent, and most preferably from about 0.1 to about 3.0 weight percent.

While the addition of the lower melting polyamides to oxymethylene polymers has provided excellent melt stability, black specks are commonly formed during both the compounding and the molding operations. As a result, the final molded article often contains black specks, thereby adversely affecting the appearance of the molded article. It is believed that the black specks are formed during processing and compounding due to the reaction of the free formaldehyde present in the oxymethylene polymer with the lower melting polyamide. The formaldehyde and polyamide are believed to react to form a gel-like substance which adheres to the extrusion screws used in the compounding and the molding equipment. The gel becomes black with the passage of time at the compounding and molding temperatures; portions eventually break apart from the screws as black specks and end up in the compounded molding composition and in the final molded object or article.

The polyamide stabilizer is used in conjunction with a hindered phenol antioxidant. Suitable phenol antioxidants are disclosed, for example, in U.S. Pat. Nos. 3,103,499 and 3,240,753. A particularly effective group of phenol antioxidants are those containing two phenol groups each with up to two alkyl substituents on the benzene ring, each alkyl substituent containing 1 to 4 carbon atoms; these include bis-phenolic diesters such as the diester of hexanediol-1,6 and 3-(3',5'-di-tert-butyl-4-hydroxy)phenylpropionic acid and alkylene bisphenols such as 2,2'-methylene bis-(4-methyl-6-tertiary butyl phenol), 2,2'-ethylene bis-(4-methyl-6-tertiary butyl phenol), 4,4'-ethylidene bis-(6-tertiary butyl-3-methyl phenol) and 4,4'-butylidene bis-(6-tertiary butyl-3-methyl phenol). Suitable phenol stabilizers other than alkylene bis-phenols include 2,6-ditertiary butyl-4-methyl phenol, octyl-phenol and p-phenyl phenol. The hindered phenol antioxidant is used in an amount from about 0.05 to about 10.0 wt. %, preferably from about 0.1 to about 5.0 wt. % and most preferably from about 0.1 to about 1.0 wt. % of the composition. The polyamide stabilizer and the hindered phenol antioxidant are added to the oxymethylene polymer by any conventional means, such as by addition to the molten oxymethylene polymer in an extruder. Preferably, a portion of the hindered phenol antioxidant (preferably from ⅓ to ⅔ of the hindered phenol antioxidant added) is added prior to the present devolatilization process.

In the process of the present invention, the oxymethylene polymer is devolatilized such that the oxymethylene polymer in the first devolatilization stage is maintained at a temperature above its melting point, in the range of from about 160° C. to about 220° C. and at a vapor spaced pressure of from about 0.1 to about 500 Torr. The polymer in the stabilization stage is maintained in the molten state at a temperature of from about 160° C. to about 220° C. The vapor space pressure in the stabilization stage is not critical, since it is a holding stage during which stabilizers and other additives may be added to the molten polymer. Whatever vapor space pressure would facilitate, or at least no inhibit, the flow of stabilizer may be utilized, usually not too far from amospheric pressure, i.e. about 500 to about 2000 Torr. The polymer in the last devolatilization stage is maintained in the molten state at a temperature of from about 160° C. to about 220° C. and at a vapor space pressure of from about 0.1 to about 200 Torr.

The maximum total residence time in the polymer processor is desirably from about 10 to about 120 seconds, preferably from about 10 to about 90 seconds and most preferably from about 20 to about 45 seconds. It will, however, be recognized that the number of stages in the claimed process increases, the residence time will normally increase. The process is capable of producing a molten oxymethylene polymer having an extractable formaldehyde level of less than about 200 parts per million and in an optimized process, less than about 125 parts per million, based on the weight of the molten oxymethylene polymer, and a natural color, as measured by Hunter "b" value, of less than about 4, preferably less than about 2.5.

DESCRIPTION OF PREFERRED EMBODIMENTS

The process of the present invention removes formaldehyde and other volatile materials from molten, extrudable and moldable oxymethylene polymers while minimizing the formation of black specks and providing a molding composition wherein the occurrence of black specks is minimized in the resulting molded objects. The process comprises adding polyamide stabilizer and the hindered phenol antioxidant to a molten oxymethylene polymer while passing such molten oxymethylene polymer through a rotary disk polymer processor having at least three stages. Polyamide stabilizer and hindered phenol antioxidant is normally added in a stabilization stage of the present process.

The vapor space pressure in the first devolatilization stage may range from about 0.1 to about 500 Torr, preferably from about 1 to about 300 Torr and most preferably from about 5 to about 200 Torr. In the second stage (first stabilization stage), in order to exclude oxygen, the vapor space pressure is maintained at about atmospheric or slightly above atmospheric pressure, preferably from about 500 to about 2000 Torr, most preferably from about 600 to about 1000 Torr. The last devolatilization stage is maintained at a vapor space pressure of from about 0.1 to about 200 Torr, preferably from about 0.1 to about 100 Torr and for optimum devolatilization efficiency, from 0.1 to about 50 Torr.

Throughout the process the polymer is maintained in the molten state at a temperature within the range of about 160° C. to about 220° C. In the last devolatilization stage the molten polymer is preferably maintained within the range of from about 160° C. to about 190° C. to further minimize thermal degradation.

A preferred process utilizes a rotary disk polymer processor having at least six stages. These include: (1) a feed stage for smoothing out flow variations to provide smoother processor operation, (2) a first devolatilization stage, (3) a stabilization stage, (4) a second devolatilization stage, (5) a holding stage to minimize surging and (6) a pumping stage for pressurizing polymer through the extrusion die. A third devolatilization stage and a second stabilization stage may also be added to provide an eight stage process.

Throughout the process the molten oxymethylene polymer is maintained at a temperature of from about 160° C. to about 220° C. In a six stage process the vapor space pressure in the second devolatilization stage is maintained in the range from about 0.1 to about 200 Torr, preferably from about 0.1 to about 100 Torr, most preferably from about 0.1 to about 50 Torr. The vapor space pressure in the second stabilization stage is not critical and the stabilization stages are normally maintained at about the same vapor space pressure, i.e. at or slightly above atmospheric pressure, preferably from about 500 to about 2000 Torr, most preferably from about 600 to about 1000 Torr. The vapor space pressures in the feed stage, holding stage and pumping stage are not critical. The feed stage and holding stage polymer vapor space pressures are normally maintained in the range of from about 500 to about 2000 Torr, preferably at about atmospheric pressure. The pumping stage is maintained at a positive vapor space pressure to facilitate pumping the molten polymer through the die.

Rotary disk polymer processors particularly suitable for use in practicing the process of the present invention are described in U.S. Pat. Nos. 4,141,805, 4,194,841 and 4,529,320, each of which is incorporated by this reference. However, other equivalent polymer processors known to those skilled in the art or subsequently developed may be used in the process of the present invention and are included within the scope of the present invention.

The number of revolutions per minute (RPM) of the disks of the rotating disk polymer processor utilized in the present process is not critical. However, if the RPM is too low, the flow of polymer will be so slow that the machine will flood. If the RPM is too high, it will be extremely difficult to maintain proper control of the polymer temperature.

The process of the present invention provides molding compositions which may be processed in the thermoplastic state, for example, by injection molding or extrusion molding, into shaped articles, for example, bars, rods, plates, sheets, films, ribbons, or tubes and the like. The process provides oxymethylene polymer molding compositions wherein the occurrence of black specks is minimized in the molding composition itself as well as in the resulting molded objects. Black specks previously had been found objectionable in objects molded from oxymethylene polymer molding compositions.

It is within the ambit of the present invention that the oxymethylene polymer molding composition also include, if desired, plasticizers, other formaldehyde scavengers, mold lubricants, antioxidants, nucleating agents, fillers, colorants, reinforcing agents, light stabilizers, pigments, other stabilizers, and the like, so long as such additives do not materially affect the desired properties of the resulting molding composition and the articles molded therefrom. The additional additives can be admixed at any convenient stage in the molding composition preparation.

Other suitable formaldehyde scavengers which may be used include cyanoguanidine, melamines, amine-substituted triazines or other amidines, ureas, hydroxyl salts of calcium, magnesium, and the like, salts of carboxylic acid, and metal oxides and hydroxides. Suitable mold lubricants include alkylene bisstearamide, long-chain amides, waxes, oils, and polyether glycides. Among the nucleating agents which can be utilized are oxymethylene terpolymers, such as butanediol diglycidyl ether-/ethylene oxide/trioxane terpolymers containing from about 99.89 to 89.0 weight percent trioxane, 0.1 to 10.0 weight percent of the ethylene oxide and 0.01 to 1 weight percent of the diglycidyl ether.

The oxymethylene polymer may be blended with the various additives discussed previously using conventional blending or mixing equipment and procedures. Thus, the oxymethylene polymer and additives may be blended in any convenient sequence using, for example, conventional mills such as rubber mills, mixers and blenders as Henschel mixers and tumble benders and extruders. In some cases, the components are first dry-mixed, e.g. in a tumble or Henschel blender, followed by melt blending, e.g. in an extruder. Some of the additives may be added to finely divided oxymethylene polymer in the form of a solution in an appropriate solvent before the final step of intimate mixing.

The following Examples are given as specific illustrations of the claimed invention. It should be understood, however, that the specific details set forth in the examples are merely illustrative and not limitative. All parts and percentages in the Examples are by weight of the total composition, unless otherwise specified.

POLYMER PREPARATION

Oxymethylene copolymer containing about 98 weight percent of recurring —$OCH_2$— groups derived from trioxane and about 2 weight percent of comonomer units having the formula —$OCH_2$—CH— and derived from ethylene oxide was prepared as described in the aforementioned U.S. Pat. No. 3,027,352, and melt hydrolyzed according to the procedure described in the aforementioned U.S. Pat. Nos. 3,318,848 and 3,418,280 to stabilize the ends of the polymer chains. The oxymethylene copolymer possessed an inherent viscosity (I.V.) of approximately 1.0 (measured at 60° C. in a 0.1 weight percent solution in p-chlorophenol containing 2 weight percent of alpha-pinene) and a softening temperature of about 160° C. A portion of the oxymethylene monomer was polymerized to obtain a copolymer having a weight average molecular weight ($m_w$) of approximately 68,000 and a Melt Index of about 9 g./10 min. when tested in accordance with ASTM method D1238-82. A second portion of the oxymethylene prepared monomer was polymerized to obtain a copolymer having a weight average molecular weight of approximately 50,000 and a Melt Index ranging from 27.4 to 31.7.

In the following Examples, the parameters and values shown are average values for a one-hour run, unless otherwise indicated.

The discoloration characteristics of the oxymethylene polymer is measured using the Hunterlab color technique before and after it has been exposed to a heat history in a Melt Indexer. The change in Hunterlab "b" value is a measure of the tendency to discolor during melt processing.

Apparatus:
1. Melt Indexer—equipped with an adjustable thermoregulator (obtainable from Precision Thermometer and Instrument Co., South Hampton, Pa., range 0° C. to 400° C.), 2160 g and 4900 g loads, and a load support.
2. Screw jack with stainless steel head beveled to match the opening in the Melt Indexer orifice retainer plate.
3. Hydraulic press with electrically heated platens.
4. Two and one quarter inch diameter plug mold, with hardened steel plugs and chrome plated, polished finish.
5. Water cooled knock-out press.
6. Aluminum dishes.
7. Hunterlab color difference meter.
8. 0.22 caliber gun cleaning patches.
9. Timer
10. Balance, accurate to 0.1 g.
11. Phospher Bronze—tipped spatula for cutting the extruded sample.

Procedure:
1. Remove orifice plate from Melt Indexer and thoroughly clean the barrel with butyrolactone and gun cleaning patches. Set the screwjack in position to seal the bottom of the barrel. Load the barrel with 10–12 g of oxymethylene polymer, using both the 2160 and 4900 g loads, and extrude after 15 minutes. Discard the extrudate and clean the apparatus.
2. Start the timer, and add 12.5 ($\pm 0.2$) g of sample to the Melt Indexer. Sample addition should take 1–2 minutes. Place the 2160 and 4900 g loads atop the sample.
3. After 30 minutes ($\pm 15$ seconds) total elapsed time, lower the screwjack and extrude the sample into a clean, labelled, aluminum dish, and let it cool. The sample will weigh about 11 ($\pm 1$) g.
4. Reclean the barrel, piston, and screwjack, and set up the Melt Indexer for the next run.
5. Place the extruder sample into a $2\frac{1}{4}''$ plug mold preheated to 191 ($\pm 3$)° C. [375 ($\pm 5$)° F.]. Transfer the sample and mold to the hydraulic press, which is also preheated to 191° C. Just close the platens, applying no pressure, for one minute. Then, apply about 10000 psi. The pressure will slowly drop to 4000 psi in $1\frac{1}{2}$–2 minutes. Manually maintain this pressure (4000 psi) until the total time under pressure is 4 minutes.
6. Transfer the mold to the sink and cool with water for 3–4 minutes. Cool both the top and bottom of the mold equally (if one side cools faster than the other, the disk will be concave). Remove the sample from the mold using the knock-out press.
7. Determine the Hunterlab color of the disk, MX "b".

Mold odor is a measurement of evolved formaldehyde.

The formaldehyde level evolved from oxymethylene polymers is measured by capturing the gases around the extrudate that issue from an extruder and using on-line sampling for GC analysis. Typical conditions were those required to extrude an oxymethylene copolymer through a $\frac{3}{4}''$ Barbender extruder at barrel temperatures from 380° F. to 440° F. and a throughput of 5 lbs/hr. The measurement is intended to give a relative measure of the propensity to evolve formaldehyde upon processing in the melt state.

A method is provided for determining the formaldehyde concentration in oxymethylene polymers, which can be extracted by refluxing with distilled water at 100° C. The formaldehyde in the neutralized water extract is determined by the standard sulfite method.

Apparatus:
1. Extraction apparatus, Soxhlet, Lab Line 5000. CSM Cat. No. 119-362.
2. Balance, Top loading, accurate to 0.1 g
3. Flask, Iodine, 500 ml. CSM Cat. No. 103-127.
4. Cylinder, graduated, 100 ml.
5. Interval Timer, Spring mechanism. CSM Cat. No. 063-891.

Reagents:
1. $H_2SO_4$, 0.10N, standardized.
2. NaOH, 0.10N, standardized.
3. Sodium sulfite, 1.0M
4. Thymolphthalein indicator.

Procedure:
1. Place a clean 500 ml. iodine flask on the top loader balance and tare. Weigh 100$\pm$0.1 g of the sample into the flask.
2. Using a 100 ml. graduate cylinder, add 100$\pm$5.0 ml. distilled water to the flask.

3. Place the flask and contents on the hot plate and connect the reflux condenser. Turn on the cooling water.
4. When reflux begins, set the timer for 60±5.0 minutes.
5. After refluxing the sample for the required time, turn off the heat, slip a plate under the flask and cool to room temperature.
6. Wash the condenser down with 15 ml. of distilled water and remove the flask. NOTE: Do not titrate the sample while still warm. The sample must be at room temperature for accurate results.
7. When the sample has been properly cooled, add 6 drops of thymolphthalein indicator and titrate to a faint blue endpoint with 0.10N NaOH. Record as titration A.
8. Add 50 ml. sodium sulfite, which has been previously neutralized to a faint blue endpoint, to the sample. Swirl the sample and let stand for 15 minutes.
9. Titrate the sample to a faint blue endpoint with 0.1N $H_2SO_4$. Record as titration B.

Calculation:
Aldehyde as Formaldehyde $$\% \text{ Formaldehyde} = \frac{Tb \times N(H_2 SO_4) \times 3.0}{\text{sample wt. in grams}}$$

OR $$\% \text{ Formaldehyde} = \text{Titration B} \times 0.0030$$

TEST SUMMARY

Test: MX color.

Measures: The degree of yellowing of oxymethylene polymer under harsh stress conditions.
Conditions: Hold sample for 30 minutes at 230° C. in a melt indexer, extrude, compression mold and read the "b" value of the chip.

EXAMPLES 1-8

Molten oxymethylene copolymer prepared as described above was fed to the first stage of a six stage rotating disk polymer processor. The process conditions and properties of the polymers for Examples 1 to 8, which exemplify the process of the present invention, are set forth in Table I below. In examples 1-8, 0.2% of the hindered phenol antioxidant was added prior to the devolatilization process. During the devolatilization process, in the first stabilization stage (Stage 3), additional stabilizer was added (0.3% of the hindered phenol antioxidant, 0.25% of the polyamide stabilizer, 0.2% of a conventional lubricant and 0.5% of a nucleating agent).

TABLE I

| Example No. | 1 | 2 | 3 | 4 | 5 | 6 | 7 | 8 |
|---|---|---|---|---|---|---|---|---|
| MI Initial | 8.9 | 9.2 | 8.0 | 8.9 | 7.6 | 9.5 | 9.3 | 9.3 |
| MI Final | 8.5 | 9.2 | 8.2 | 8.3 | 8.2 | 9.3 | 9.9 | 10.0 |
| xHCHO Initial | 730 | 790 | 750 | 730 | 690 | 660 | 810 | 810 |
| xHCHO Final | 80 | 90 | 110 | 100 | 90 | 90 | 80 | 70 |
| Initial b Color | 2.2 | 1.8 | 2.1 | 2.2 | 1.4 | 1.4 | 1.5 | 1.5 |
| Final b Color | 1.7 | 2.5 | 2.2 | 1.6 | 2.4 | 2.2 | 2.3 | 2.2 |
| Flow Rate | 82 | 90 | 115 | 55 | 66 | 83 | 91 | 104 |
| Disk RPM | 30 | 47 | 50 | 30 | 30 | 30 | 50 | 50 |
| Temperatures: | | | | | | | | |
| Water Bath | 45 | 45 | 45 | 45 | 45 | 45 | 45 | 45 |
| Barrel Oil | 182 | 143 | 127 | 166 | 182 | 166 | 127 | 143 |
| Rotor Oil | 165 | 144 | 128 | 149 | 165 | 149 | 128 | 144 |
| Stage 1 | 211 | 211 | 211 | 211 | 218 | 211 | 209 | 208 |
| Stage 2 | 184 | 191 | 183 | 187 | 196 | 193 | 179 | 185 |
| Stage 3 | 186 | 174 | 174 | 173 | 184 | 179 | 170 | 177 |
| Stage 4 | 187 | 181 | 181 | 176 | 183 | 179 | 175 | 180 |
| Stage 5 | 190 | 183 | 191 | 177 | 189 | 189 | 182 | 192 |
| Stage 6 | 181 | 162 | 169 | 166 | 179 | 171 | 148 | 163 |
| Die | 197 | 198 | 212 | 186 | 199 | 197 | 205 | 214 |
| Vapor Space Pressures: | | | | | | | | |
| Stage 1 | 760 | 760 | 760 | 760 | 760 | 760 | 760 | 760 |
| Stage 2 | 35 | 29 | 21 | 38 | 37 | 35 | 32 | 31 |
| Stage 3 | 1000 | 1000 | 1000 | 1000 | 1000 | 1000 | 1000 | 1000 |
| Stage 4 | 19 | 15 | 19 | 19 | 19 | 16 | 18 | 16 |
| Stage 5 | 760 | 760 | 760 | 760 | 760 | 760 | 760 | 760 |
| Stage 6 | 760 | 760 | 760 | 760 | 760 | 760 | 760 | 760 |
| Die Pressure | 954 | 1030 | 1010 | 843 | 701 | 801 | 966 | 1030 |
| Residence Time | 40 | 35 | 25 | 45 | 45 | 40 | 35 | 25 |

Units:
xHCHO   ppm extractable formaldehyde
Feed Rate   kg/hr
Temperature   degrees Centigrade (°C.)
Vapor Space Pressure   mm Hg absolute (Torr)
Die Pressure   psig
Residence Time   seconds Table II sets forth the process conditions and polymer properties for comparative Examples 9 to 16 which correspond to Examples 1 to 8 of copending U.S. application Ser. No. 797,054, which discloses and claims a process for devolatilizing oxymethylene polymers. In these examples, 0.2% of the hindered phenol antioxidant was added prior to the devolatilization process. During devolatilization, in the first stabilization stage, additional stabilizer was added (0.3% of the hindered phenol, 0.1% of a conventional thermal stabilizer, 0.2% of a conventional lubricant and 0.5% of a nucleating agent.

TABLE II

| Comparative Example No. | 9 | 10 | 11 | 12 | 13 | 14 | 15 | 16 |
|---|---|---|---|---|---|---|---|---|
| MI Initial | 9.3 | 8.7 | 7.6 | 7.6 | 8.0 | 9.3 | 8.9 | 9.3 |
| MI Final | 9.4 | 8.8 | 9.1 | 9.1 | 7.2 | 9.2 | 8.7 | 9.9 |
| xHCHO Initial | 730 | 750 | 690 | 690 | 750 | 690 | 730 | 790 |
| xHCHO Final | 220 | 160 | 160 | 140 | 200 | 140 | 130 | 210 |
| Initial b Color | 1.5 | 1.6 | 1.4 | 1.4 | 2.1 | 1.9 | 2.2 | 1.8 |
| Final b Color | 1.5 | 1.7 | 2.1 | 1.8 | 2.4 | 2.0 | 1.7 | 3.6 |
| Flow Rate | 82 | 91 | 118 | 59 | 59 | 82 | 91 | 127 |
| Disk RPM | 30 | 50 | 50 | 30 | 30 | 30 | 50 | 50 |
| Temperatures: | | | | | | | | |
| Water Bath | 45 | 45 | 45 | 45 | 45 | 45 | 45 | 45 |
| Barrel Oil | 182 | 143 | 127 | 166 | 182 | 166 | 127 | 143 |
| Rotor Oil | 165 | 144 | 128 | 149 | 165 | 149 | 128 | 144 |
| Stage 1 | 209 | 213 | 209 | 214 | 215 | 208 | 212 | 211 |
| Stage 2 | 192 | 191 | 188 | 186 | 195 | 188 | 188 | 193 |
| Stage 3 | 187 | 174 | 172 | 173 | 184 | 176 | 168 | 179 |
| Stage 4 | 187 | 178 | 177 | 175 | 184 | 179 | 173 | 186 |
| Stage 5 | 198 | 184 | 188 | 178 | 191 | 181 | 182 | 192 |
| Stage 6 | 183 | 165 | 166 | 166 | 182 | 168 | 159 | 171 |
| Die | 205 | 205 | 207 | 191 | 203 | 188 | 205 | 206 |
| Vapor Space Pressures: | | | | | | | | |
| Stage 1 | 760 | 760 | 760 | 760 | 760 | 760 | 760 | 760 |
| Stage 2 | 36 | 32 | 24 | 33 | 36 | 34 | 27 | 26 |
| Stage 3 | 1000 | 1000 | 1000 | 1000 | 1000 | 1000 | 1000 | 1000 |
| Stage 4 | 19 | 12 | 19 | 19 | 19 | 19 | 18 | 19 |
| Stage 5 | 760 | 760 | 760 | 760 | 760 | 760 | 760 | 760 |
| Stage 6 | 760 | 760 | 760 | 760 | 760 | 760 | 760 | 760 |
| Die Pressure | 714 | 847 | 951 | 742 | 771 | 1040 | 921 | 1200 |
| Residence Time | 40 | 35 | 25 | 45 | 45 | 40 | 35 | 25 |

Units:
xHCHO — ppm extractable formaldehyde
Feed Rate — kg/hr
Temperature — degrees Centigrade (°C.)
Vapor Space Pressure — mm HG absolute (Torr)
Die Pressure — psig
Residence Time — seconds Table III below shows the unexpected improvement in removing formaldehyde when, according to the process of the present invention, the combination of a polyamide stabilizer and a hindered phenol antioxidant are added to the oxymethylene polymer prior to devolatilization in a rotary disk polymer processor.

TABLE III
Comparison of Tables I and II

| | Present Invention | Application Ser. No. 797,054 |
|---|---|---|
| Average xHCHO, Initial | 746.25 | 727.5 |
| Average xHCHO, Final | 88.75 | 170.0 |
| Average xHCHO, Reduction | 657.5 | 557.5 |

Table IV below sets forth a comparison between oxymethylene copolymers having a Melt Index of approximately 9, prepared as set forth previously at page 14 wherein Sample A is oxymethylene copolymer produced by the process of the present invention. Sample B was produced by adding about 0.25% of a polyamide stabilizer and about 0.5% of a hindered phenol antioxidant, according to the process of the present invention, but utilized a vented twin screw extruder to devolatilize the polymer, rather than the process of the present invention; Sample C was produced by adding 0.5% of a hindered phenol antioxidant, 0.1% of a conventional thermal stabilizer, 0.2% of a conventional lubricant and 0.5% of a nucleating agent to the oxymethylene copolymer, which was then devolatilized by passing the molten polymer through a vented twin screw extruder; Sample D was produced by adding 0.5% of a hindered phenol antioxidant, 0.1% of a conventional thermal stabilizer, 0.2% of a conventional lubricant and 0.5% of a nucleating agent to the oxymethylene polymer which was then devolatilized utilizing a rotary disk polymer processor, according to the process disclosed in copending U.S. application Ser. No. 06/797,054.

TABLE IV

| Sample Designation | A (1) | B (2) | C (3) | D (4) |
|---|---|---|---|---|
| xHCHO, Final (5) | 110 | 210 | 280 | 150 |
| Mx Hunter b color | 4.3 | 12.1 | 25.1 | 19.0 |
| Mold Odor (HCHO) (6) | 0.19 | 0.89 | 0.98 | — |

(1) average of 8 week run on 200 mm, rotary disk polymer processor
(2) average of 1 year commercial production
(3) average of 1 year commercial production
(4) average of 26 runs on 200 mm rotary disk polymer processor
(5) xHCHO - extractable formaldehyde expressed in PPM.
(6) GC peak height

EXAMPLE 9

Molten oxymethylene copolymer prepared as described above, having a Melt Index of about 27.4, an initial Hunter b color of 1.8 and an extractable formaldehyde level of about 1190 PPM, was fed to the first stage of a rotating disk polymer processor. The molten polymer was fed to the polymer processor at a temperature of about 191° C. The disk processor utilized had an internal diameter of 200 mm. and contained six stages, as described above. The molten polymer entered the feed stage at a feed rate of about 112 kilograms per hour and the disks of the rotary disk processor were rotating at about 55 revolutions per minute. In the first stabilization stage, additional stabilizer was added (0.3% of a conventional hindered phenol type antioxidant, 0.25% of a polyamide, 0.2% of a conventional lubricant and 0.5% of a nucleating agent). The total polymer residence time through the disk processor was about 25 seconds. The temperature of the oil circulated within the outer shell of the polymer processor (barrel oil temperature) was about 171° C. The oil temperature in the rotating disks (rotor oil temperature) was about 149° C.

The temperature and pressure conditions for each of the six stages are shown below in Table 9:

TABLE 9

| Stage | 1 | 2 | 3 | 4 | 5 | 6 |
|---|---|---|---|---|---|---|
| Temp. °C. | 191 | 189 | 190 | 189 | 191 | 173 |
| Vapor Space Press. (Torr) | 760 | 4 | 1000 | 20 | 760 | 760 |

The devolatilized molten oxymethylene polymer was pumped from stage 6 through a die maintained at a temperature of about 191° C. and having a die pressure of about 656 psig. The strands were passed through a water bath maintained at a temperature of about 45° C. to solidify the molten polymer. The solidified strands were then passed through an air knife to a pelletizer operating at about 59 RPM to produce the final product in pellet form. The extractable formaldehyde level of the final product was about 90 parts per million (PPM), the final Hunter b color was 2.1 and the final Melt Index was about 26.6.

EXAMPLE 10

Molten oxymethylene copolymer, having a Melt Index of about 31.7, an initial Hunter b color of 1.5 and an extractable formaldehyde level of about 860 PPM, prepared as described above, was fed to the feed stage of a six stage disk polymer processor. The molten polymer was fed to the polymer processor at a temperature of about 193° C. The molten polymer entered the first stage at a feed rate of about 83 kilograms per hour and the disks of the rotary disk processor were rotating at about 55 revolutions per minute. In the first stabilization stage, stabilizer was added as in Example 9. The total polymer residence time through the disk processor was about 30 seconds. The barrel oil temperature was about 188° C. and the rotor oil temperature was about 165° C.

The temperature and pressure conditions for each of the six stages are shown below in Table 10:

TABLE 10

| Stage | 1 | 2 | 3 | 4 | 5 | 6 |
|---|---|---|---|---|---|---|
| Temp. °C. | 193 | 184 | 184 | 185 | 197 | 177 |
| Vapor Space Press. (Torr) | 760 | 16 | 1000 | 19 | 760 | 760 |

The devolatilized molten polymer was pumped from stage 6 through a die maintained at about 203° C. and having a die pressure of about 657 psig. The strands were passed through a water bath maintained at a temperature of about 45° C. to solidify the molten polymer. The solidified strands were then passed through an air knife and a pelletizer operating at about 59 RPM to produce the final product in pellet form. The extractable formaldehyde level of the final product was about 120 PPM, the final Hunter b color was 2.5 and the Melt Index was about 27.8.

EXAMPLE 11

Example 11 represents an eight week run. The operating parameters and results are the average values for the eight week run. Molten oxymethylene copolymer prepared as described above, having a Melt Index of about 8.5, an initial Hunter b color of 1.9 and an extractable formaldehyde level of about 520 PPM, was fed to the feed stage at a six stage disk polymer processor. The molten polymer was fed to the polymer processor at a temperature of about 202° C. The molten polymer entered the first stage at a feed rate of about 81 kilograms per hour and the disks of the rotary disk processor were rotating to about 30 revolutions per minute. In the first stabilization stage, stabilizer was added as in Example 9. The total polymer residence time through the disk processor was about 40 seconds. The barrel oil temperature was about 188° C. and the rotor oil temperature was about 130° C.

The temperature and pressure conditions for each of the six stages are shown below in Table 11:

TABLE 11

| Stage | 1 | 2 | 3 | 4 | 5 | 6 |
|---|---|---|---|---|---|---|
| Temp. °C. | 202 | 192 | 190 | 183 | 177 | 176 |
| Vapor Space Press. (Torr) | 760 | 14 | 1000 | 17 | 760 | 760 |

The devolatilized molten polymer was pumped from stage 6 through a die maintained at about 177° C. and having a die pressure of about 739 psig. The strands were passed through a water bath maintained at a temperature of about 45° C. to solidify the molten polymer. The solidified strands were then passed through an air knife and a pelletizer operating at about 59 RPM to produce the final product in pellet form. The extractable formaldehyde level of the final product was about 110 PPM, the final Hunter b color was 1.8 and the Melt Index was about 8.5.

I claim:

1. A process for reducing black speck formation which occurs during melt processing of oxymethylene polymer compositions containing polyamide stabilizers having a melting or softening point below the melting point of the oxymethylene polymer and for simultaneously removing volatile materials from a molten oxymethylene polymer, comprising adding to the oxymethylene polymer from 0.05 to about 5.0 weight percent, based on the weight of the oxymethylene polymer of said polyamide stabilizer and from about 0.05 to about 10.0 weight percent, based on the weight of the oxymethylene polymer, of a hindered phenol antioxidant while passing said molten oxymethylene polymer through a rotating disk polymer processor having at least three stages, the three stages comprising in sequence a first devolatilization stage, then a stabilization stage and then a second devolatilization stage, the molten polymer in the first devolatilization stage being maintained at a temperature above its melting point in the temperature range of from about 160° C. to about 220° C. and at a vapor space pressure of from about 0.1 to about 500 Torr, the polymer in the stabilization stage being maintained in the molten state at a temperature of from 160° to about 220° C., the polymer in the last devolatilization stage being maintained in the molten state at a temperature of from about 160° C. to 220° C. and at a vapor space pressure of from about 0.1 to about 200 Torr.

2. The process of claim 1 wherein from about 0.1 to about 5.0 weight percent of said polyamide stabilizer is added.

3. The process of claim 1 wherein from about 0.1 to about 3.0 weight percent of said polyamide stabilizer is added.

4. The process of claim 1 wherein a polyamide stabilizer having a melting temperature from about 105° C. to about 160° C. is added.

5. The process of claim 1 wherein a polyamide stabilizer which is a terpolymer of nylon 6,6/nylon 6,10/nylon 6 is added.

6. The process of claim 1 wherein from about 0.1 to about 3 weight percent of the polyamide stabilizer and from about 0.1 to about 1.0 weight percent of the hindered phenol antioxidant is added to the molten oxymethylene polymer.

7. The process of claim 1 wherein the molten polymer in the last devolatilization stage is maintained at a temperature within the range of from about 160° C. to about 190° C. and a vapor space pressure from about 0.1 to about 100 Torr.

* * * * *